United States Patent
Klar et al.

(10) Patent No.: US 9,229,104 B2
(45) Date of Patent: Jan. 5, 2016

(54) SENSOR ASSEMBLY FOR DRIVER ASSISTANCE SYSTEMS IN MOTOR VEHICLES

(75) Inventors: Michael Klar, Magstadt (DE); Gerald Zeller, Ludwigsburg (DE); Bernhard Lucas, Besigheim (DE)

(73) Assignee: ROBERT BOSCH GMBH, Stuttgart (DE)

( * ) Notice: Subject to any disclaimer, the term of this patent is extended or adjusted under 35 U.S.C. 154(b) by 658 days.

(21) Appl. No.: 13/265,798

(22) PCT Filed: Feb. 25, 2010

(86) PCT No.: PCT/EP2010/052410
§ 371 (c)(1),
(2), (4) Date: Dec. 22, 2011

(87) PCT Pub. No.: WO2010/121859
PCT Pub. Date: Oct. 28, 2010

(65) Prior Publication Data
US 2012/0092499 A1    Apr. 19, 2012

(30) Foreign Application Priority Data

Apr. 24, 2009  (DE) .................. 10 2009 002 626

(51) Int. Cl.
| G06F 17/10 | (2006.01) |
| G06G 7/78 | (2006.01) |
| G08G 1/16 | (2006.01) |
| H04N 7/18 | (2006.01) |
| G01S 13/93 | (2006.01) |
| G01S 13/86 | (2006.01) |
| G01S 7/40 | (2006.01) |

(52) U.S. Cl.
CPC ............. *G01S 13/931* (2013.01); *G01S 13/867* (2013.01); *G01S 2007/403* (2013.01)

(58) Field of Classification Search
USPC ....................................... 348/61–161
See application file for complete search history.

(56) References Cited

U.S. PATENT DOCUMENTS

| 5,836,398 | A | * | 11/1998 | White ............................. 169/24 |
| 5,935,190 | A | * | 8/1999 | Davis et al. ................... 701/119 |
| 6,526,352 | B1 | * | 2/2003 | Breed et al. ................... 701/470 |
| 6,577,933 | B2 | * | 6/2003 | How ................................ 701/23 |
| 6,820,897 | B2 | * | 11/2004 | Breed et al. ................... 280/735 |
| 7,663,502 | B2 | * | 2/2010 | Breed ......................... 340/12.25 |
| 2003/0201929 | A1 | * | 10/2003 | Lutter et al. .................... 342/52 |
| 2005/0146458 | A1 | * | 7/2005 | Carmichael et al. ............ 342/52 |
| 2007/0021915 | A1 | * | 1/2007 | Breed et al. ................... 701/301 |
| 2008/0001809 | A1 | * | 1/2008 | Woodington et al. ........... 342/70 |
| 2010/0100324 | A1 | * | 4/2010 | Caminiti et al. .............. 701/301 |
| 2010/0214160 | A1 | * | 8/2010 | Smith et al. .................. 342/25 F |
| 2012/0092499 | A1 | * | 4/2012 | Klar et al. .................... 348/148 |
| 2014/0104051 | A1 | * | 4/2014 | Breed ........................... 340/435 |

FOREIGN PATENT DOCUMENTS

| DE | 10 2007 018470 | 10/2008 |
| WO | WO 2006/035510 | 4/2006 |

* cited by examiner

*Primary Examiner* — Joseph Ustaris
*Assistant Examiner* — Talha Nawaz
(74) *Attorney, Agent, or Firm* — Kenyon & Kenyon LLP

(57) ABSTRACT

A sensor assembly is described for driver assistance systems in motor vehicles, having a radar sensor and a video camera, in which the radar sensor and the video camera are integrated into a common housing.

8 Claims, 2 Drawing Sheets

SENSOR ASSEMBLY FOR DRIVER ASSISTANCE SYSTEMS IN MOTOR VEHICLES

FIELD OF THE INVENTION

The present invention relates to a sensor assembly for driver assistance systems in motor vehicles, having a radar sensor and a video camera.

BACKGROUND INFORMATION

Driver assistance systems such as ACC (Adaptive Cruise Control) or collision warning systems (PSS, Predictive Safety Systems) require a sensor system in order to acquire the surrounding traffic situation, in particular in order to locate vehicles traveling in front. This sensor system typically includes a radar sensor or a video camera having an associated electronic image evaluation system, or also a combination of both sensor systems. Such a combination is particularly useful because the specific strengths of the different sensor systems supplement one another. Thus, a radar sensor enables, in general, a precise measurement of radial distances and radial speeds, but only a relatively low-resolution measurement of azimuth angles, and only a rough estimation of the width of located objects, whereas a video camera permits precise measurement of azimuth angles, cross-speeds, and object widths, but (in particular in the case of a monocular system) offers only a low degree of precision in the measurement of radial distances and speeds.

German patent document DE 10 2007 018 470 A1 discusses a sensor system that includes a combination of a radar sensor and a video camera, and an electronic evaluation system that fuses the data of the two sensor types with one another.

In available sensor assemblies, the radar sensor is standardly attached to the outside of the vehicle, usually in the area of the front bumper. The video camera, on the other hand, is typically situated inside the vehicle, behind the windshield.

An object of the exemplary embodiments and/or exemplary methods of the present invention is to create a sensor assembly of the type described above that can be particularly easily installed and adjusted.

According to the exemplary embodiments and/or exemplary methods of the present invention, this object may be achieved in that the radar sensor and the video camera are integrated into a common housing.

The radar sensor and the video camera should in general be adjusted so that their optical axes run exactly parallel to one another, for example exactly in the longitudinal direction of the vehicle. The integration of the radar sensor and the video camera in a common housing makes it possible to carry out this adjustment of the two components relative to one another at the manufacturer with a high degree of precision. During installation in the motor vehicle, the housing then need only be mounted in or on the vehicle body and adjusted relative to the body, thus significantly simplifying the assembly and adjustment processes. For example, the adjustment relative to the vehicle body can take place on a suitable test bench with the aid of the video image recorded by the video camera itself, whereby at the same time a correct adjustment of the radar sensor relative to the vehicle body is also achieved.

The common housing can for example be attached in the interior of the vehicle, behind the windshield, as the video camera was previously.

Advantageous embodiments and developments of the present invention are described herein.

In a particularly advantageous specific embodiment, the common housing contains electronic components for a common pre-evaluation of the data of the radar sensor and of the video camera. In this case, the fusion of the data can already take place at a low level, namely at the sensor level, using the electronic components in the common housing, the data of the radar sensor facilitating the interpretation of the video image and vice versa, so that the amount of data to be communicated from the housing to the rest of the vehicle electronics system can be significantly reduced.

An exemplary embodiment of the present invention is shown in the drawings and is explained in more detail in the following description.

DETAILED DESCRIPTION

Figure 1:
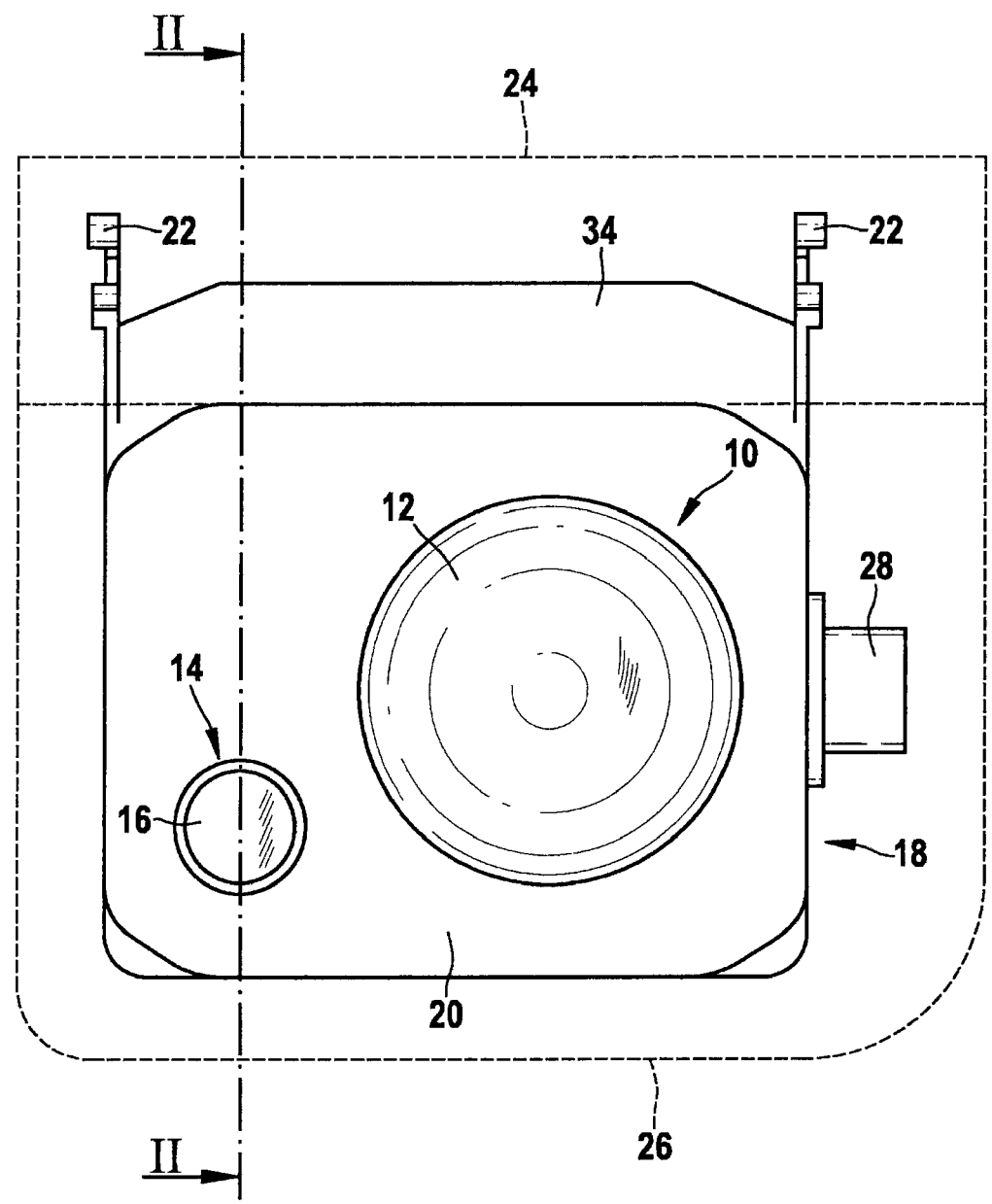
FIG. 1 shows a schematic front view of a sensor assembly according to the present invention in a common housing.

The sensor assembly shown in FIG. 1 includes a radar sensor 10, of which only a radar lens 12 is visible in the front view, and a video camera 14 having an objective 16. Radar sensor 10 and video camera 14 are situated in a common housing 18 in such a way that radar lens 12 and objective 16 are held in a common front housing cover 20.

On the upper side of housing 18 there are situated fastening projections 22 that in the depicted example are formed such that they enable a locking connection of housing 18 to a console 24 that is connected fixedly to the vehicle and is shown only in broken lines. A covering 26 can also be mounted on console 24, surrounding housing 18 on its other sides and essentially leaving exposed only front housing cover 20 with radar lens 12 and objective 16.

Attached laterally in housing 18 is a plug connector 28 that creates the connection between the sensor assembly and the other electronic components of the vehicle, and that is also accommodated in covering 26 together with a counter-plug connector (not shown) at the vehicle side.

Figure 2:
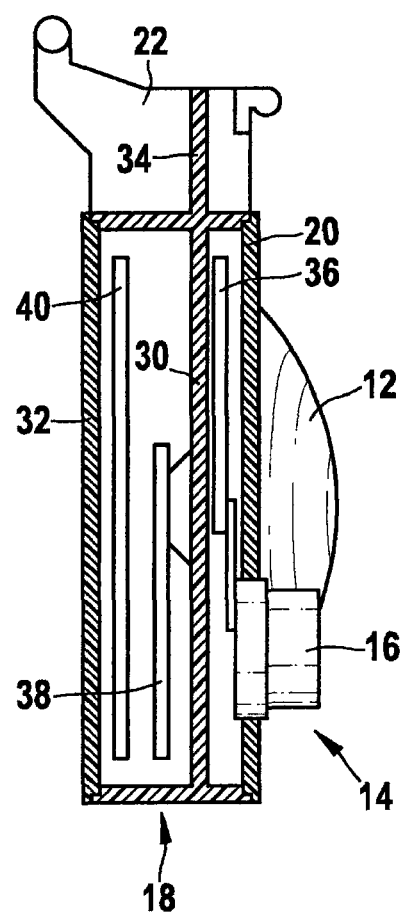
FIG. 2 shows a schematic section through the housing along the line II-II in FIG. 1.

FIG. 2 shows housing 18 in section, so that radar lens 12 and objective 16 of the video camera are seen in a side view.

Inside housing 10 there is a separating wall 30 that runs parallel to front housing cover 20 and to a rear housing cover 32 and that extends upward past the upper wall of the housing, up to a web 34 that connects and rigidifies the two fastening projections 22.

A circuit board 36 is equipped with electronic components (not shown) for controlling video camera 14, and is fastened to separating wall 30 so that it is accommodated in the intermediate space between this separating wall and front housing cover 20. Another circuit board 38 bears, in a known manner, the RF part and the antennas of the radar sensor, and is fastened to the opposite side of separating wall 30 so that it is accommodated in the intermediate space between this separating wall and rear housing cover 32. Radar lens 12 and video camera 16 are held in front housing cover 20 in such a way that their optical axes are oriented exactly parallel to one another. The two circuit boards 36 and 38 are attached fixedly to separating wall 18. Because front housing cover 20 is held fixedly in housing 10, a stable spatial relationship is permanently ensured between radar lens 12 and the antennas on circuit board 38.

In the intermediate space between circuit board 38 and rear housing cover 32 in housing 10, a further circuit board 40 is accommodated that is equipped with electronic components of a common evaluation electronics system for radar sensor 10 and video camera 14. This evaluation electronics system is connected, via lines that are not shown, to the components of the control electronics system for video camera 14, and to the RF part of radar sensor 10, and permits a fusion and common pre-evaluation of the location data of the radar sensor and the video camera. During this common pre-evaluation, on the basis of the location data supplied by radar sensor 10 and the images supplied by video camera 14 individual objects can be identified and followed in their temporal development over a plurality of temporally successive measurement cycles of the radar sensor. Here, radar sensor 10 supplies relatively precise data concerning the radial distance and radial speed of the located objects, and, because it is an angle-resolving radar sensor, also provides data concerning the azimuth angle at which the respective objects are seen. This makes it possible to identify the images of the objects recorded by video camera 14 with the objects located by the radar sensor. By evaluating the video images, the azimuth angles of the individual objects can be determined more precisely, and in addition more precise information about the width of each of the objects can be obtained. Finally, in the pre-evaluation stage a continuously updated list is in this way obtained of all located objects, including precise data concerning their radial distances and speeds, as well as their lateral position and width. These data are read via plug connector 28 and are transmitted over corresponding data lines (not shown) to an electronic data processing system (not shown) that is installed at another location in the vehicle. The pre-processing of the data inside the sensor assembly significantly reduces the quantity of data that is to be transmitted, so that the required data transmission capacity can be provided without difficulty.

Via plug connector 28, radar sensor 10 and video camera 14 are also supplied with operating voltage and with the required control signals.

What is claimed is:

1. A sensor assembly for a driver assistance system in a motor vehicle, comprising:
   a radar sensor; and
   a video camera;
   wherein:
   the radar sensor and the video camera are integrated into a common housing,
   a radar lens of the radar sensor and an objective of the video camera are mounted in a front housing cover of the housing with their optical axes oriented parallel to one another,
   the housing accommodates an electronic circuit for the fusion of location data of the radar sensor and the video camera,
   a first circuit board that is equipped with an RF part and antenna elements of the radar sensor is mounted fixedly on a first side of a separating wall inside the housing,
   a second circuit board that controls the video camera is mounted on a second side of the separating wall opposite the first side, and
   the electronic circuit for the fusion of location data is electrically connected to the first circuit board and the second circuit board, and located in an intermediate space between the first circuit board and a rear housing cover of the housing.

2. The sensor assembly of claim 1, wherein the electronic circuit performs a preliminary analysis of the location data of the radar sensor and the video camera.

3. The sensor assembly of claim 2, wherein the electronic circuit is configured to transmit a result of the preliminary analysis to an evaluation system remote from the sensor assembly.

4. The sensor assembly of claim 3, wherein the result of the preliminary analysis includes a continuously updated list of located objects and, for each located object, data describing at least one of a radial distance, a speed, a lateral position and a width of the located object.

5. A sensor assembly for a driver assistance system in a motor vehicle, comprising:
   a radar sensor;
   a video camera;
   wherein:
   the radar sensor and the video camera are integrated into a common housing,
   a radar lens of the radar sensor and an objective of the video camera are mounted in a front housing cover of the housing with their optical axes oriented parallel to one another,
   a first circuit board that is equipped with an RF part and antenna elements of the radar sensor is mounted fixedly on a first side of a separating wall inside the housing, and
   a second circuit board that controls the video camera is mounted on a second side of the separating wall opposite the first side; and
   an electronic circuit that fuses location data of the radar sensor and the video camera, wherein the electronic circuit is located in a space between the separating wall and a rear housing cover of the housing.

6. The sensor assembly of claim 5, wherein the electronic circuit performs a preliminary analysis of the location data of the radar sensor and the video camera.

7. The sensor assembly of claim 6, wherein the electronic circuit is configured to transmit a result of the preliminary analysis to an evaluation system remote from the sensor assembly.

8. The sensor assembly of claim 7, wherein the result of the preliminary analysis includes a continuously updated list of located objects and, for each located object, data describing at least one of a radial distance, a speed, a lateral position and a width of the located object.

* * * * *